United States Patent Office 3,597,465
Patented Aug. 3, 1971

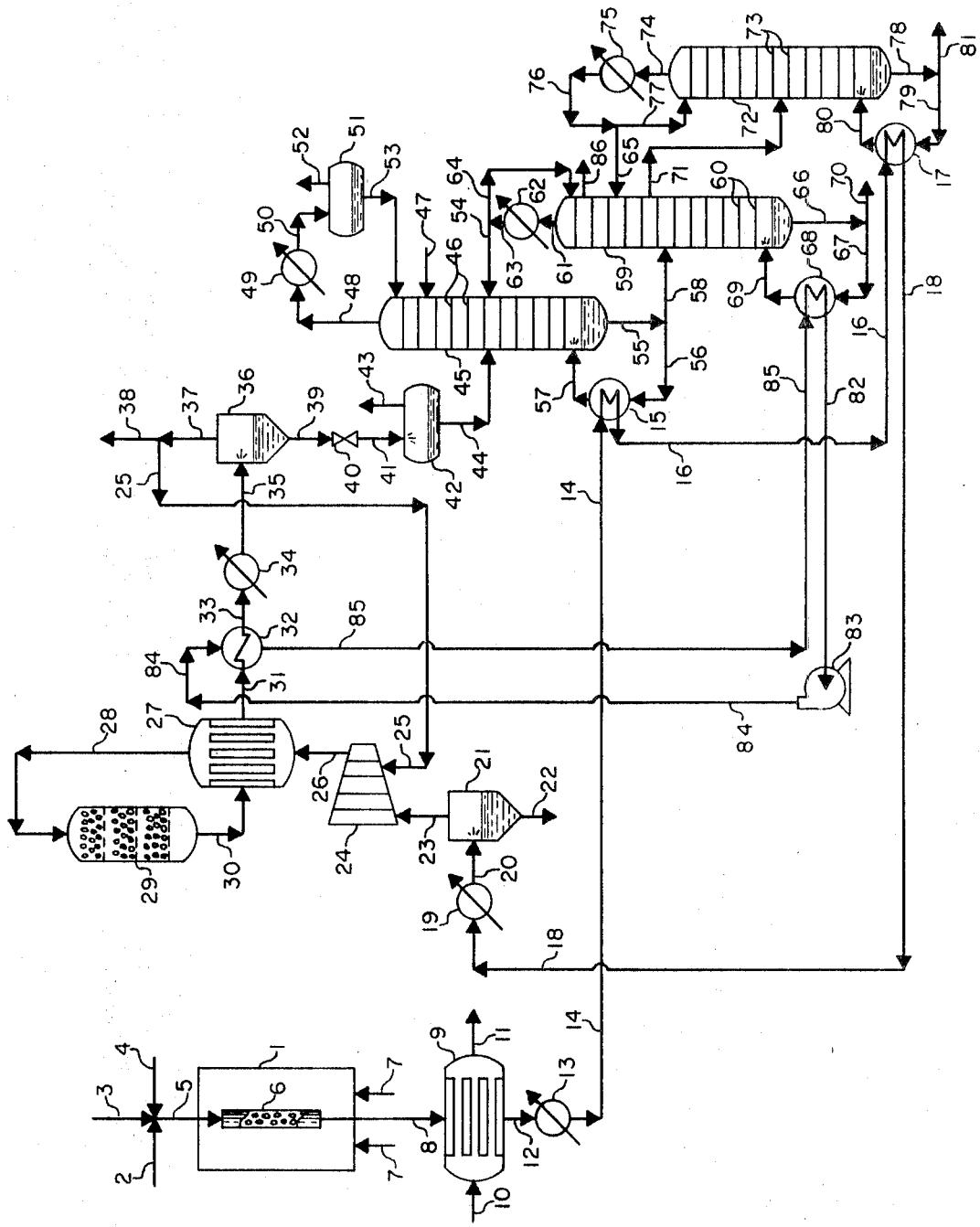

3,597,465
PRODUCTION OF SYNTHETIC METHANOL
Maxim Karafian, Cold Spring Harbor, Dinshaw D. Mehta, New York, and Saverio A. Sama, Thornwood, N.Y., assignors to Chemical Construction Corporation, New York, N.Y.
Filed Mar. 4, 1968, Ser. No. 710,068
Int. Cl. C07c 29/16
U.S. Cl. 260—449.5      5 Claims

ABSTRACT OF THE DISCLOSURE

An integrated methanol synthesis process is provided in which the reboilers of the distillation units in the methanol purification section are heated in an improved manner, to effectively recover heat and utilize this heat to reboil and vaporize the methanol distillation column bottoms. In one aspect of the invention, crude methanol synthesis gas produced at elevated temperature by the catalytic steam reforming of a fluid hydrocarbon is passed through one or more distillation column reboilers, to cool the synthesis gas by useful heat exchange which reboils the distillation column bottoms. In another embodiment of the invention, hot converted synthesis gas from the catalytic methanol synthesis converter is cooled by heat exchange with a circulating fluid, which is thereby heated. The heated fluid is circulated through a distillation column reboiler, to provide a heating effect which reboils the distillation column bottoms. The cooled fluid is recirculated for further heat exchange with converted gas.

BACKGROUND OF THE INVENTION

Field of the invention

The invention relates to catalytic methanol synthesis processes in which crude methanol synthesis gas is produced by the catalytic steam reforming of a fluid hydrocarbon, the crude synthesis gas is cooled and combined with with recycle gas to form a methanol synthesis gas stream, synthetic methanol is prepared in the vapor state by the catalytic conversion of a portion of the methanol synthesis gas stream at elevated pressure, and crude liquid methanol is condensed by cooling the converted gas stream. The crude liquid methanol is then separated and purified by a distillation procedure such as water extractive distillation followed by rectification, in which each of the distillation column bottoms are heated and partially vaporized in a reboiler.

Description of the prior art

Synthesis gas for catalytic methanol production is generally produced by the catalytic steam reforming of a fluid hydrocarbon such as methane or naphtha, by processes such as described in U.S. Patent No. 3,351,563. One type of apparatus for producing synthesis gas is described in U.S. Patents Nos. 3,129,065 and 3,127,248. Suitable high pressure apparatus for carrying out the catalytic synthesis of methanol vapor from synthesis gas is described in U.S. Patent No. 3,212,862. Another apparatus for this purpose is described in U.S. Patent No. 3,366,461. The separation of crude liquid methanol from the synthesis loop is described in U.S. patent application No. 530,118, filed Feb. 25, 1966 and now abandoned. The purification of crude liquid methanol by distillation is described in U.S. Pat. No. 3,230,156 and U.S. patent application No. 602,388 filed Dec. 16, 1966 and issued as U.S. Pat. No. 3,406,100 on Oct. 15, 1968. In these prior art procedures, the various hot process streams are cooled by heat exchange with cooling water, and the reboilers of the distillation columns are heated with steam.

SUMMARY OF THE INVENTION

In the present invention, the requisite heat for heating the methanol distillation column bottoms in reboilers, during the purification of crude synthetic methanol, is provided in a novel manner by heat exchange of the bottoms with hot crude methanol synthesis gas and with a heat exchange fluid which is heated by heat exchange with hot converted methanol synthesis gas. The invention is preferably applied to a methanol purification procedure by distillation, in which initial purification is attained by a water extractive distillation, followed by a rectification distillation of the aqueous bottoms from water extractive distillation, to produce pure anhydrous methanol. In one embodiment of the invention, a side stream is removed from the rectification column and distilled to produce an overhead methanol stream which is recycled to rectification, and a bottoms tails stream of aqueous methanol containing ethanol impurity. In these various distillation sequences, the bottoms from the distillation towers or columns must be heated and reboiled in reboilers to provide hot vapor for the distillation effect. In the present invention, the reboilers are heated by utilizing hot crude methanol synthesis gas and hot effluent gas from the catalytic methanol synthesis converter as heat sources. The hot crude methanol synthesis gas is passed through one or more reboilers, in heat exchange with distillation column bottoms, to provide a heating effect. In the case of the hot effluent gas from the catalytic methanol synthesis converter, this gas stream is cooled in heat exchange with a suitable heat transfer fluid such as pressurized water, glycol, or an aqueous solution of methanol or similar organic liquid. The heated fluid is passed through a reboiler and is cooled by heat exchange with the distillation column bottoms. The resulting cooled fluid is recycled for repeated heating by heat exchange with hot converter exit gas.

The principal advantage of the invention is that the requisite heating for the reboilers of the methanol distillation procedure is provided in a highly efficient manner, by utilizing methanol synthesis process gas streams as heat sources. Another advantage is that the prior art requirement of large quantities of cooling water for the required cooling of the methanol synthesis process gas streams has now been reduced or eliminated. Thus, a further advantage is that the overall heat economy and efficiency of the methanol synthesis process is highly improved. Another advantage, derived from the use of a circulating heat exchange fluid which circulates between the converted gas heat exchanger and a reboiler, is that the amount of high pressure piping for recovery of heat from the high pressure hot converted gas stream is substantially reduced.

It is an object of the present invention to provide an improved methanol synthesis process.

Another object is to heat the reboilers of the methanol distillation section of a synthetic methanol facility in an improved manner.

A further object is to usefully recover heat from hot process gases in a synthetic methanol process which produces methanol synthesis gas by the catalytic steam reforming of a fluid hydrocarbon, and catalytically synthesizes methanol vapor at elevated temperature and pressure from the synthesis gas.

An additional object is to heat reboilers in the distillation section of a synthetic methanol facility, by heat exchange and heat recovery from hot process gases produced in the synthesis gas production and catalytic methanol synthesis sections of the facility.

These and other objects and advantages of the present invention will become evident from the description which follows.

DESCRIPTION OF THE DRAWING AND PREFERRED EMBODIMENTS

Referring to the drawing, a flowsheet of a preferred embodiment of the invention is presented, in which heat exchange and recovery takes place from hot crude methanol synthesis gas produced by steam reform of a fluid hydrocarbon, and from hot converted gas discharged from a methanol synthesis converter. The recovered heat is applied by heat exchange ot the respective reboilers of a water extractive distillation column, a rectification distillation column, and a methanol recovery column, in the crude methanol purification section wherein crude liquid methanol is purified by distillation, as will appear infra.

Unit 1 is a catalytic steam reformer for the conversion of a mixture of a fluid hydrocarbon and steam to synthesis gas. Feed streams consisting of fluid hydrocarbon stream 2, steam stream 3 and carbon dioxide stream 4 are combined to form feed stream 5 which is passed to catalytic steam reforming at a pressure typically in the range of 3 kg./sq. cm. to 50 kg./sq. cm. Stream 4 may be omitted in some instances, such as when stream 2 consists of vaporized naphtha, which serves to directly provide the proper ratio of carbon oxides to hydrogen in the reformed synthesis gas. Stream 5 is passed in parallel through a plurality of catalyst-filled reformer tubes such as tube 6, which is provided with a charge of a suitable reforming catalyst such as nickel or cobalt or their oxides, deposited on a suitable carrier. Tube 6 is externally heated by the combustion of fluid hydrocarbon fuel streams 7 within unit 1.

A crude reformed synthesis gas stream 8 is discharged from tube 6 at an elevated temperature typically in the range of 800° C. to 1100° C. Stream 8 now principally contains hydrogen and carbon oxides, together with residual steam and a minor proportion of inerts such as methane, and stream 8 has the proper ratio of hydrogen to carbon oxides for methanol synthesis gas. Stream 8 is initially cooled in process gas waste heat boiler 9, by heat exchange with condensate or boiler feed water stream 10, which is vaporized to form generated process steam stream 11. The cooled process synthesis gas stream 12 discharged from unit 9 at a temperature typically in the range of 400° C. to 600° C. is further cooled in heat exchanger 13, which is typically an economizer for the preheating of boiler feed water. The resulting synthesis gas stream 14 discharged from unit 13 is now at a reduced temperature typically in the range of 150° C. to 200° C., and is now suitable for utilization in accordance with the present invention.

Stream 14 is now passed through the coil of reboiler 15, and in heat exchange with water extractive distillation column bottoms, as will appear infra. The synthesis gas stream is further cooled in unit 15, and transfers heat to the bottoms for the required reboiling and vaporization of bottoms for the distillation procedure. The resulting further cooled synthesis gas stream 16 discharged from unit 15 is at a reduced temperature and may contain a condensed liquid water phase which may be removed in gas-liquid separation means, not shown. In any case, stream 16 is subsequently passed through the coil of reboiler 17, and in heat exchange with methanol recovery distillation columns bottoms, as will appear infra. The synthesis gas stream is further cooled in unit 17, and transfers heat to the bottoms for the required reboiling and vaporization of bottoms for the distillation procedure. The resulting further cooled synthesis gas stream 18 discharged from unit 17 is now at a reduced temperature typically in the range of about 80° C. to 140° C.

Further and final cooling of the synthesis gas stream 18 now takes place by heat exchange with cooling water in heat exchanger unit 19. The resulting fully cooled synthesis gas stream 20 is now at a temperature typically in the range of 30° C. to 80° C., and a pressure in the range of 2 kg./sq. cm. to 40 kg./sq. cm. Stream 20 contains a condensed liquid water phase, which is separated from the synthesis gas phase by passing stream 20 into separator 21, which is a baffled or cyclonic gas-liquid separator of conventional design. Separated liquid water stream 22 is discharged from unit 21, and stream 22 may be discharged to waste or passed to a degasifier and recycled as process condensate.

The water-free process synthesis gas stream 23 discharged from unit 21 is now suitable for usage as makeup methanol synthesis gas, and is compressed to methanol synthesis pressure in centrifugal compressor 24. A recycle synthesis gas stream 25, derived from the synthesis loop as will be described infra, is passed into the final stage or wheel of the compressor 24 for mixture with the partially compressed makeup gas stream 23 and subsequent recycle to methanol synthesis. The fully compressed methanol synthesis gas stream 26 is discharged from unit 24 at a pressure typically in the range of 50 kg./sq. cm. to 500 kg./sq. cm. and a temperature in the range of about 30° C. to 130° C., and is now heated to a suitable temperature for catalytic methanol synthesis by heat exchange with hot catalytically reacted gas. Stream 26 is passed through gas-to-gas heat exchanger 27, and the resultant feed synthesis gas stream 28 discharged from unit 27 is now at an elevated temperature typically in the range of 250° C. to 350° C., and is suitable for passage to methanol synthesis.

Stream 28 is now passed into methanol synthesis converter 29, in which the catalytic conversion of a portion of the synthesis gas to methanol vapor takes place. A conventional catalyst for methanol synthesis, such as zinc chromite, is employed in unit 29, and the catalyst is generally provided in a plurality of beds in series, with interbed cooling being attained by the bypass injection of a portion of stream 26 into unit 29 between beds, to provide a quench of the hot gas stream between stages of catalytic conversion. A hot reacted or converted gas stream 30 is discharged from unit 29, typically at a temperature in the range of 300° C. to 400° C. Stream 30 contains methanol vapor and unreacted synthesis gas, and stream 30 is now cooled to selectively condense crude liquid synthetic methanol.

Stream 30 is initially passed through heat exchanger 27, and the resulting partially cooled gas stream 31, now at a temperature typically in the range of 160° C. to 220° C., is further cooled in accordance with the present invention in heat exchanger 32 by heat exchange with a suitable heat transfer fluid, as will appear infra. The resulting cooled process stream 33 is now at a temperature in the range of about 110° C. to 170° C., and is further cooled in heat exchanger 34 by indirect heat exchange with cooling water to condense substantially all of the methanol vapor in the gas stream to crude liquid methanol. The resulting fully cooled process stream 35 is now at a temperature typically in the range of about 20° C. to 50° C., and stream 35 now contains a condensed liquid phase consisting of crude synthetic methanol. Stream 35 is passed into gas-liquid separator 36, which is a conventional separator unit and may be similar in configuration to unit 21 described supra. The unreacted gas phase is removed from unit 36 via stream 37, which is divided into recycle stream 25 and purge gas stream 38. Stream 25 is recycled to methanol synthesis as described supra, at an elevated pressure typically in the range of 50 kg./sq. cm. to 500 kg./sq. cm. Purge gas stream 38 may be vented or discharged to the atmosphere, however in most instances stream 38 will be utilized after pressure reduction as a fuel gas, since stream 38 has a substantial heating value. In some instances stream 38 may be utilized as a component of stream 7.

Returning to unit 36, crude liquid synthetic methanol is withdrawn via steam 39 at a highly elevated pressure, and is passed through pressure reducing valve 40 in order to reduce the pressure of the crude methanol to a level suitable for subsequent purification by distillation. The resulting crude liquid methanol stream 41 discharged by valve 40 is now at a reduced pressure typically in the range of about 2 kg./sq. cm. to 12 kg./sq. cm. and stream 41 contains an evolved gaseous phase which is generated due to pressure reduction. The evolved gaseous phase principally contains synthesis gas components including hydrogen, carbon monoxide and inerts such as methane, together with methanol vapor. Stream 41 is passed into letdown tank 42, from which the evolved gaseous phase stream 43 consisting of letdown purge gas is removed and vented to atmosphere or utilized as a fuel gas in a manner similar to stream 38. Stream 43 is usually scrubbed with water to recover methanol vapor as an aqueous methanol solution in a packed vent gas scrubber, not shown, prior to further utilization.

A crude liquid methanol stream 44 is also removed from unit 42, and stream 44 will generally be at a pressure typically in the range of 2 kg./sq. cm. to 12 kg./sq. cm. and a temperature typically in the range of 20° C. to 50° C. Stream 44 is now passed to a suitable distillation sequence for purification, in which distillation column bottoms are heated and reboiled in accordance with the heat exchange concepts of the present invention. In this preferred embodiment of the invention, stream 44 is initially subjected to a water extractive distillation procedure, in which water is employed to increase the relative volatility of impurities. Stream 44 is passed into the middle section of extractive distillation column 45, which is provided with a plurality of bubble cap distillation plates 46. The plates 46 may alternatively consist of sieve or valve trays. Water stream 47 is passed into the upper portion of column 45, and provides an aqueous solution phase through the column. An overhead vapor stream 48 is removed from the top of unit 45. Stream 48 contains methanol vapor, volatile components such as dimethyl ether, and minor proportions of other organic impurities, synthesis gas components and methane. Stream 48 is cooled and partially condensed in heat exchanger 49, and the resulting mixed gas-liquid stream 50 is passed into reflux drum 51. The residual overhead vapor phase is removed from drum 51 via stream 52, which may be cooled in means not shown to selectively condense crude liquid dimethyl ether for byproduct recovery. In any case, the residual overhead vapor phase from unit 51 or from the selective condensation of dimethyl ether is subsequently vented to atmosphere or utilized as fuel gas. The liquid phase in unit 51, principally consisting of methanol, is recycled from drum 51 to column 45 via stream 53 as a liquid reflux. An impure liquid methanol stream 54 is also recycled to the middle section of unit 45 for purification. Stream 54 is derived from a subsequent aqueous methanol rectification procedure, as will appear infra.

The liquid bottoms from extractive distillation column 45, consisting of a partially purified aqueous methanol solution, is removed via steam 55, which is at a temperature generally in the range of about 80° C. to 100° C. A portion of stream 55 is utilized in accordance with the present invention as stream 56, which is passed into heat exchange reboiler 15 for heating and partial vaporization by indirect heat transfer from stream 14. The resulting mixed vapor-liquid stream 57 is returned into unit 45 below the lower tray section, to provide vapor and a heating effect for distillation.

The balance of stream 55 is passed via stream 58 to subsequent processing for the production of highly purified methanol. Stream 58 is passed into the middle section of rectification column 59, which separates residual impurities and water from product anhydrous methanol by distillation. Column 59 is similar in configuration to column 45 described supra, and is provided with a plurality of trays 60, which may consist of bubble cap or sieve trays or the like. Most of the methanol component of stream 58 is vaporized in column 59, and moves upwards in the column. Pure anhydrous methanol is removed via stream 86 from the upper section of the column 59, usually as a liquid side stream, and passed to product utilization.

An overhead vapor steam 61 consisting mostly of methanol vapor together with a very minor proportion of impurities is removed from the top of column 59. Stream 61 is condensed in cooler 62 by heat exchange with cooling water or other suitable coolant, and the resultant liquid overhead stream 63 is divided into stream 54, which is recycled to column 45 as described supra, and stream 64, which is recycled to the top plate of unit 59 as liquid reflux. Purified recovered methanol stream 65, derived in a manner to be described infra and containing only a very minor residual proportion of impurities such as water and ethanol, is recycled to column 59 at an upper plate below the drawoff point of stream 86.

The liquid bottoms from rectification column 59, consisting essentially of water containing only a very minor residual proportion of methanol, is removed via stream 66, which is at a temperature generally in the range of about 100° C. to 130° C. A portion of stream 66 is utilized in accordance with the present invention as stream 67, which is passed into heat exchange reboiler 68 for heating and partial vaporization by indirect heat transfer from a hot heat exchange fluid, as will appear infra. The resulting mixed vapor-liquid stream 69 is returned into unit 59 below the lower tray section, to provide water vapor or steam and a heating effect for distillation. The balance of stream 66 is passed via stream 70 to waste disposal or further process utilization. In most instances, a portion of stream 70 will be cooled and recycled as stream 47.

Returning to column 59, a side or purge stream 71 is withdrawn from the middle section of the column, to depress the level of impurities such as ethanol in the column, and thereby effectively produce a more highly purified methanol product via stream 86. Stream 71 is passed into the middle section of methanol recovery column 72, which separates and recovers a purified methanol stream for recycle to unit 59. Column 72 is similar in configuration to column 45 described supra, and is provided with a plurality of trays 73, which may consist of bubble cap or sieve trays or the like. A major proportion of the methanol component of stream 71 is vaporized in column 72, and moves upwards in the column. An overhead vapor stream 74 consisting mostly of methanol vapor together with a very minor proportion of impurities, principally water and ethanol, is removed from the top of column 72. Stream 74 is condensed in cooler 75 by heat exchange with cooling water or other suitable coolant, and the resultant liquid overhead stream 76 is divided into stream 65, which is recycled to column 59, as described supra, and stream 77, which is recycled to the top plate of unit 72 as liquid reflux.

The liquid bottoms from methanol recovery column 72, consisting of an aqueous methanol solution containing impurities such as ethanol, is removed via stream 78, which is at a temperature generally in the range of about 60° C. to 100° C. A portion of stream 78 is utilized in accordance with the present invention as stream 79, which is passed into heat exchange reboiler 17 for heating and partial vaporization by heat transfer from stream 16. The resulting mixed vapor-liquid stream 80 is returned into unit 72 below the lower tray section, to provide vapor and a heating effect for distillation. The balance of stream 78 is passed via stream 81 to tails disposal or storage, or further processing and utilization. In some instances, all of stream 78 will be passed to tails disposal via stream 81, and stream 79 will be derived from the body of liquid on the lowest tray 73 within unit 72.

Referring now to heat exchange reboiler 68, a heat effect is obtained, by heat transfer from a hot heat exchange fluid, as mentioned supra. The resulting cooled heat exchange fluid stream 82 is discharged from unit 68 at a temperature typically in the range of 90° C. to 160° C. Stream 82 may consist of water, glycol, aqueous methanol solution, or other suitable heat exchange fluid having the requisite thermodynamic characteristics for efficient heat transfer, and in most instances stream 82 is at an elevated pressure typically in the range of 2 kg./sq. cm. to 10 kg./sq. cm. Stream 82 passes into fluid circulating pump 83, and the fluid stream 84 discharged from unit 83 passes into unit 32 for reheating by heat exchange with converted methanol synthesis gas stream 31 as described supra. The resulting heated fluid stream 85 is discharged from unit 32 at an elevated temperature generally in the range of 130° C. to 200° C., and is recycled to unit 68.

Numerous alternatives within the scope of the present invention will occur to those skilled in the art, in addition to the alternatives mentioned supra. The ranges of process variables such as temperature and pressure constitute a preferred embodiment of the invention for optimum utilization of the inventive concept, and the invention may be practiced outside of these ranges in suitable instances. As mentioned supra, in some instances stream 79 may be derived from the lowest distillation plate of the respective column 72. Similar considerations apply to streams 56 and 67, in which case all of stream 55 would be passed to unit 59 via stream 58, and all of stream 66 would be discharged via stream 70. In this case, stream 56 would be derived from the liquid in the lowest plate of unit 45, and stream 67 would be derived from the liquid on the lowest plate of unit 59. As is well known to those skilled in the methanol distillation art, the liquid composition on the lowest plate of a distillation column such as unit 45, 59 or 72 closely approximates the composition of the column bottoms.

The invention is generally applicable to the heating of distillation column bottoms in any type of crude methanol distillation procedure, such as the procedure of U.S. Pat. No. 3,230,156. Thus, stream 14 or stream 85 may alternatively be passed in heat exchange with distillation column bottoms in other reboilers. In one alternative, stream 14 could be circulated in heat exchange through any or all of reboilers 15, 68 and 17, or through reboilers 68 and 17 in series, or through reboilers 15 and 68 in series, or through any other combination of two or three reboilers in series or even in parallel, in which latter case stream 14 would be divided into two or three portions which would be passed in parallel through two or three reboilers and subsequently re-combined for passage via stream 18 to unit 19. Similar considerations apply to stream 85, which could alternatively be circulated in heat exchange through any or all reboilers 15, 68 and 17, either in series or in parallel. The various combinations of heat exchange transfer and process fluid flow through the respective reboilers will depend on engineering considerations in a specific facility.

An example of an industrial application of the present invention to the design of a commercial 1000 tons/day methanol production facility will now be described.

EXAMPLE

The concepts of the present invention were applied with respect to usable heat recovery in a facility producing 1000 tons per day of purified methanol. Following is pertinent data relative to this specific application of the invention.

TABLE I.—OPERATING CONDITIONS

| Stream No. | Temp., °C. | Pressure, kg./sq. cm. | Total flow rate, kg./hr. | Vapor or gas component, kg./hr. |
|---|---|---|---|---|
| 31 | 192 | 343 | 272,400 | 272,40 |
| 33 | 141 | 341 | 272,400 | 254,50 |
| 84 | 127 | 10.96 | 541,000 | |
| 85 | 153 | 9.9 | 541,000 | |
| 82 | 127 | 9.21 | 541,000 | |
| 67 | 111 | 1.76 | 57,400 | |
| 69 | 111 | 1.76 | 57,400 | 28,20 |
| 14 | 167 | 20.75 | 78,200 | 78,20 |
| 16 | 127 | 20.01 | ¹ 61,900 | 61,900 |
| 18 | 91 | 19.73 | 61,900 | 61,90 |
| 56 | 90 | 1.76 | 117,000 | |
| 57 | 90 | 1.76 | 117,000 | 23,20 |
| 79 | 80 | 1.55 | 42,800 | |
| 80 | 81 | 1.55 | 42,800 | 12,80 |

¹ Net flow after removal of 16,300 condensed water.

TABLE II.—HEAT REMOVAL AND RECOVERY

| Unit No.: | Heat exchanged million B.t.u./hour |
|---|---|
| 32 | 59.6 |
| 68 | 59.6 |
| 15 | 40.7 |
| 17 | 22.14 |

TABLE III.—STREAM COMPOSITIONS

| Stream No. | 31 | 84 | 67 | 14 | 56 | 79 |
|---|---|---|---|---|---|---|
| Composition, mol percent: | | | | | | |
| Carbon monoxide | 6.96 | | | 21.77 | | |
| Carbon dioxide | 2.44 | | | 7.22 | | |
| Hydrogen | 56.47 | | | 68.28 | | |
| Methane | 22.26 | | | 2.31 | | |
| Nitrogen | 5.23 | | | 0.42 | | |
| Methanol | 5.05 | | 0.10 | | 23.85 | 34.68 |
| Water | 1.46 | 100 | 99.90 | | 76.04 | 63.30 |
| Organic impurities | 0.13 | | | | 0.11 | 2.02 |

We claim:

1. In a catalytic methanol synthesis process in which a fluid hydrocarbon is catalytically steam reformed to produce a high temperature synthesis gas stream for methanol synthesis, said synthesis gas stream is cooled in a steam boiler to an intermediate temperature by a first heat exchange with water, said intermediate temperature synthesis gas stream is further cooled by a second heat exchange, said synthesis gas stream being cooled to a reduced temperature at which liquid water is condensed from the gas stream, the resulting cooled gas stream is compressed, the compressed gas stream is combined with a recycle gas stream to form a methanol synthesis feed gas stream, said feed gas stream is heated by a third heat exchange, the heated feed gas stream is passed to catalytic methanol synthesis at elevated pressure and temperature, the resulting converted gas stream containing methanol vapor is cooled by said third heat exchange, the cooled converted gas stream is further cooled by a fourth heat exchange, said converted gas stream being cooled to a reduced temperature at which crude liquid methanol is condensed from the residual gas phase, said crude liquid methanol is separated from the residual gas phase at elevated pressure, said residual gas phase is divided into a purge gas stream and said recycle gas stream, the pressure of said crude liquid methanol is reduced, and said crude liquid methanol is distilled at reduced pressure for purification, said distillation of crude methanol taking place in a plurality of distillation columns provided with lower reboilers in which column bottoms are heated and partially vaporized, the improved method of heating methanol distillation column bottoms in said reboilers which comprises cooling said intermediate temperature synthesis gas stream in said second heat exchange by passing said intermediate temperature synthesis gas stream through at least a first of said reboilers, whereby said intermediate temperature synthesis gas stream is cooled and methanol distillation column bottoms are heated and partially vaporized, passing a liquid through said fourth heat exchange, whereby said liquid is heated without vaporization by heat exchange with said converted gas stream, passing the heated liquid through a second of said reboilers, whereby said liquid is cooled by heat exchange with methanol distillation column bottoms, and recycling the cooled liquid to said fourth heat exchange.

2. The method of claim 1, in which said liquid is water.

3. The method of claim 1, in which said second heat exchange in said first reboiler takes place in the reboiler of an extractive distillation column, and said second reboiler through which said liquid is passed is the reboiler of a rectification column.

4. The method of claim 1, in which said intermediate temperature synthesis gas stream is passed in series through the reboiler of an extractive distillation column and through the reboiler of a distillation column in which the distillation of a side stream from a rectification column takes place, said side stream distillation serving to provide a purified methanol overhead stream which is recycled to said rectification column, and a bottoms tails stream containing methanol, water and ethanol.

5. The method of claim 1, in which said intermediate temperature synthesis gas stream is cooled by said second heat exchange from a temperature in the range of 150° C. to 200° C., to a temperature in the range of 80° C. to 140° C., said cooled converted gas stream is further cooled by said fourth heat exchange from a temperature in the range of 160° C. to 220° C., to a temperature in the range of 110° C. to 170° C., said liquid is heated by said fourth heat exchange to a temperature in the range of 130° C. to 200° C., and said liquid is cooled in said second reboiler to a temperature in the range of 90° C. to 160° C.

References Cited

UNITED STATES PATENTS

| | | | |
|---|---|---|---|
| 2,617,272 | 11/1952 | Aicher | 203—21X |
| 2,904,575 | 9/1959 | Peet | 260—449.5 |
| 2,964,551 | 12/1960 | Woolcock | 260—449.5 |
| 3,064,029 | 11/1962 | White | 260—449.5 |
| 3,234,109 | 2/1966 | Lustenader | 203—22X |
| 3,442,770 | 5/1969 | Wentworth et al. | 203—25 |

JOSEPH SCOVRONEK, Primary Examiner

U.S. Cl. X.R.

23—263; 48—197; 165—107; 203—25

UNITED STATES PATENT OFFICE
CERTIFICATE OF CORRECTION

Patent No. 3,597,465　　　　　Dated August 3, 1971

Inventor(s) MAXIM KARAFIAN et al

It is certified that error appears in the above-identified patent and that said Letters Patent are hereby corrected as shown below:

Column 8 Table I, under heading "Vapor or Gas Components, kg./hr.", read:

>　　272,400
>　　254,500
>　　　　　0
>　　　　　0
>　　　　　0
>　　　　　0
>　　 28,200
>　　 78,200
>　　 61,900
>　　 61,900
>　　　　　0
>　　 23,200
>　　　　　0
>　　 12,800

Signed and sealed this 28th day of December 1971.

(SEAL)
Attest:

EDWARD M. FLETCHER, JR.　　　　　ROBERT GOTTSCHALK
Attesting Officer　　　　　　　　　Acting Commissioner of Patents